(12) United States Patent
Han et al.

(10) Patent No.: US 7,663,539 B2
(45) Date of Patent: Feb. 16, 2010

(54) AUTOMATIC DECORRELATION AND PARAMETER TUNING REAL-TIME KINEMATIC METHOD AND APPARATUS

(75) Inventors: Shaowei Han, Palo Alto, CA (US); Liwen Dai, Pomona, CA (US)

(73) Assignee: MNI, Inc., Santa Clara, CA (US)

( * ) Notice: Subject to any disclaimer, the term of this patent is extended or adjusted under 35 U.S.C. 154(b) by 0 days.

(21) Appl. No.: 11/938,217

(22) Filed: Nov. 9, 2007

(65) Prior Publication Data

US 2008/0074319 A1 Mar. 27, 2008

Related U.S. Application Data

(63) Continuation of application No. 10/826,270, filed on Apr. 19, 2004, now Pat. No. 7,298,319.

(51) Int. Cl.
*G01S 5/14* (2006.01)

(52) U.S. Cl. .............................................. 342/357.02

(58) Field of Classification Search ............ 342/357.02, 342/357.04
See application file for complete search history.

(56) References Cited

U.S. PATENT DOCUMENTS

| | | | |
|---|---|---|---|
| 5,748,145 A * | 5/1998 | Talbot et al. ............ | 342/357.04 |
| 6,181,274 B1 * | 1/2001 | Pratt et al. ............. | 342/357.04 |
| 7,298,319 B2 | 11/2007 | Han et al. | |
| 2005/0190103 A1 * | 9/2005 | Rapoport et al. ....... | 342/357.04 |

OTHER PUBLICATIONS

Directins Magazine "Thales Navigation Z-Max Professional Surveyors ProductivityWith Unique Modular Design and Superiorr RTK Positioning" Aug. 28, 2003 Press Release.*
Thales Navigation, "Z-Max Surveying System," Product Sheet from www.thalesnavigation.com, Aug. 18, 2003.*
Abousalem et al, "Ashtech Instant RTK: A Revolutionary Solution for Surveying Professionals," Presented at the 3rd Internatinal Symposium on Mobile Mapping Technology, Cairo, Egypt, Jan. 2001, pp. 1-13.*
Dai, Liwen, et al, "A Multiple Outlier Detection Alogirthm for Instantaneous Ambiguity Resolution for Carrier Phase Based GNss Positioning," Proceedings of the International Symposium on Digital Earth, 1999, pp. 1-12.*
Park, Chansik et al, "Efficient Ambiguity Resolution Using Constraint Equation," IEEE Plans 1996, pp. 277-284.*
Teunissen, P.J.G., "A New Method for Fast Carrier Phase Ambiguity Estimation," IEEE Plans 1994, pp. 562-573.*
Directions Magazine, "Thales Navigation Z-Max Gives Professional Surveyors Maximum Productivity with Unique, Modular Design and Superior RTK Positioning," Aug. 28, 2003 press release.
Abousalem et al., "Ashtech Instant RTK: A Revolutionary Solution for Surveying Professionals," Presented at the 3rd International Symposium on Mobile Mapping Technology, Cairo, Egypt, Jan. 2001, pp. 1-13.
Dai, Liwen et al., "A Multiple Outlier Detection Algorithm for Instantaneous Ambiguity Resolution for Carrier Phase-Based GNSS Positioning," Proceedings of the International Symposium on Digital Earth, 1999, pp. 1-12.
Park, Chansik et al., "Efficient Ambiguity Resolution Using Constraint Equation," IEEE Plans 1996, pp. 277-284.

* cited by examiner

*Primary Examiner*—Gregory C Issing
(74) *Attorney, Agent, or Firm*—Greenberg Traurig, LLP

(57) ABSTRACT

A method of and computer-readable medium containing instructions for high accuracy, reliable position determination. The ADAPT-RTK Technology (Automatic Decorrelation and Parameter Tuning Real-Time Kinematic technology) is described using an innovative decorrelation algorithm to decorrelate the correlation between L1 and L2 measurements through a functional model and a stochastic model reducing the impact on performance of distance dependent biases.

15 Claims, 7 Drawing Sheets

Figure 4. iRTK System Architecture for both Time-Tagged Mode and Fast-RTK Mode

Figure 5. iRTK System Architecture for Kalman Filtering and Ambiguity Resolution

AUTOMATIC DECORRELATION AND PARAMETER TUNING REAL-TIME KINEMATIC METHOD AND APPARATUS

CROSS-REFERENCE TO RELATED APPLICATIONS

The present application is a continuation application of U.S. patent application Ser. No. 10/826,270, filed on Apr. 19, 2004, entitled "Automatic Decorrelation and Parameter Tuning Real-Time Kinematic Method and Apparatus," which is assigned to the present assignee and is incorporated herein by reference in its entirety. The present application is also related to U.S. patent application Ser. No. 10/610,544, entitled "Accurate and Fast RTK" and U.S. patent application Ser. No. 10/610,541, entitled "Enhanced Real-Time Kinematics Determination Method and Apparatus, both filed on Jul. 2, 2003, which are assigned to the present assignee and are incorporated herein by reference in their entirety.

FIELD OF THE INVENTION

The present invention relates to a method of and apparatus for an improved decorrelation and parameter tuning capability for real time kinematics (RTK) determination.

BACKGROUND

High precision GPS kinematic positioning is widely used for many surveying and navigation applications on land, at sea and in the air. The distance from the mobile receiver to the nearest reference receiver may range from a few kilometers to hundreds of kilometers. As the receiver separation increases, the problem of accounting for distance-dependent biases grows and, as a consequence, reliable ambiguity resolution becomes an even greater challenge.

The standard mode of precise differential positioning uses one reference receiver located at a station whose coordinates are known, while determining a second receiver's coordinates relative to the reference receiver. In addition, the second receiver may be static or moving, and carrier phase measurements must be used to assure high positioning accuracy. This is the basis for pseudo-range-based differential global positioning system (GPS) (DGPS for short) techniques. However, for high precision applications, the use of carrier phase data comes at a cost in terms of overall system complexity because the measurements are ambiguous, requiring that ambiguity resolution (AR) algorithms be incorporated as an integral part of the data processing software.

Such high accuracy techniques result from progressive research and development (R&D) innovations, subsequently implemented by GPS manufacturers in top-of-the-line "GPS surveying" products. Over the last decade, several significant developments have resulted in the high accuracy performance also being available in "real-time"—that is, in the field, immediately following measurement, and after the data from the reference receiver has been received by the (second) field receiver for processing via a data communication link (e.g., very high frequency (VHF) or ultra high frequency (UHF) radio, cellular telephone, frequency modulation (FM) radio sub-carrier or satellite communication link). Real-time precise positioning is even possible when the GPS receiver is in motion through the use of "on-the-fly" (OTF) AR algorithms. These systems are commonly referred to as "real-time kinematic" (RTK) systems, and make feasible the use of GPS-RTK for many time-critical applications, e.g., machine control, GPS-guided earthworks/excavations, automated haul truck operations, and other autonomous robotic navigation applications.

If the GPS signals were continuously tracked (loss-of-lock never occurred), the integer ambiguities resolved at the beginning of a survey would be valid for the whole GPS kinematic positioning span. However, the GPS satellite signals are occasionally shaded (e.g. due to buildings in "urban canyon" environments), or momentarily blocked (e.g. when the receiver passes under a bridge or through a tunnel), and in these circumstances the integer ambiguity values are "lost" and must be re-determined or re-initialized. This process can take from a few tens of seconds up to several minutes with present OTF AR techniques. During this "re-initialization" period, the GPS carrier-range data cannot be obtained and there is "dead" time until sufficient data has been collected to resolve the ambiguities. If GPS signal interruptions occur repeatedly, ambiguity re-initialization is, at the very least, an irritation, and, at worst, a significant weakness of commercial GPS-RTK positioning systems. In addition, the longer the period of tracking required to ensure reliable OTF AR, the greater the risk that cycle slips occur during the crucial (re-) initialization period. A loss of lock of a receiver phase lock loop causing a sudden integer number of cycles jump in a carrier phase observable is known as a cycle slip. Receiver tracking problems or an interrupted ability of the antenna to receive satellite signals causes the loss of lock. As the receiver separation increases, the problems of accounting for distance-dependent biases grow and, as a consequence, reliable ambiguity resolution (or re-initialization) becomes an even greater challenge due to:

Residual biases or errors;
Observation span determination; and
Kinematic positioning results quality control.

Residual biases or errors after double-differencing can only be neglected for AR purposes when the distance between two receivers is less than about 10 km. For distances greater than 10 km, the distance-dependent biases, such as orbit bias, ionospheric delay and tropospheric delay, become significant problems.

Determining how long an observation span should be for reliable AR is a challenge for real-time GPS kinematic positioning. The longer the observation span required, the longer the "dead" time during which precise position determination is not possible. This can happen at the ambiguity initialization step if a GPS survey is just starting, or at the ambiguity re-initialization step if the GPS signals are blocked, such as due to cycle slips or data interruptions.

Quality control of GPS kinematic positioning results is a critical issue and is necessary during all processes: data collection, data processing and data transmission. Quality control procedures are not only applied for carrier phase-based GPS kinematic positioning, but also for pseudo-range-based DGPS positioning. However, quality control or validation criteria for AR, for precise GPS kinematic positioning, is a significant challenge.

There is a need in the art for an improved method of processing GPS signals to improve decorrelation and parameter tuning capabilities for high accuracy, reliable position determination.

SUMMARY

It is therefore an object of the present invention to provide a method of processing GPS signals to improve decorrelation and parameter tuning capabilities for high accuracy, reliable position determination.

In an embodiment according to the present application, the ADAPT-RTK Technology (Automatic Decorrelation and Parameter Tuning Real-Time Kinematic technology) is described using an innovative decorrelation algorithm to decorrelate the correlation between L1 and L2 measurements through a functional model and a stochastic model reducing the impact on performance of distance dependent biases. Therefore, the ADAPT-RTK Technology improves GPS RTK performance to exceed other products in the market, especially on long-range applications.

The present inventors have successfully implemented the present decorrelation approach in a Z-Max RTK engine from Thales Navigation. After extensive testing using Z-Xtreme and Z-Max receivers, the most exciting results have been derived.

The decorrelation approach has significant advantages: (1) it more closely describes the measurement natural features, especially in long-range applications; (2) it is a rigorous approach from a Kalman filtering implementation point of view; (3) all other approaches, e.g., widelane/iono-free approach, widelane only approach, become special cases in theory and in practice, and; (4) it significantly improves RTK performance, especially for long-range applications.

The functional model includes determining the reference satellite, residuals, and design matrix. The stochastic model includes variance-covariance matrix determination for measurements and the variance-covariance matrix for dynamic noise in Kalman filtering.

The RTK technique requires available dual frequency pseudo-range and carrier phase measurements. On-the-fly RTK might not necessarily need pseudo-range measurements because the float solution can be derived by the change of carrier phase measurements between epochs (or Doppler measurements). However, the float solution using data from a single epoch must be derived by pseudo-range measurements. The integrated function model means modeling carrier phase measurements and also pseudo-range measurements and their stochastic features are included. The stochastic model for carrier phase measurements and pseudo-range measurements, especially the ratio between standard deviations of carrier phase and pseudo-range, significantly affects the float solution and subsequently affects the RTK performance. The present invention provides appropriate stochastic models for both carrier phase and pseudo-range to enhance RTK performance.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
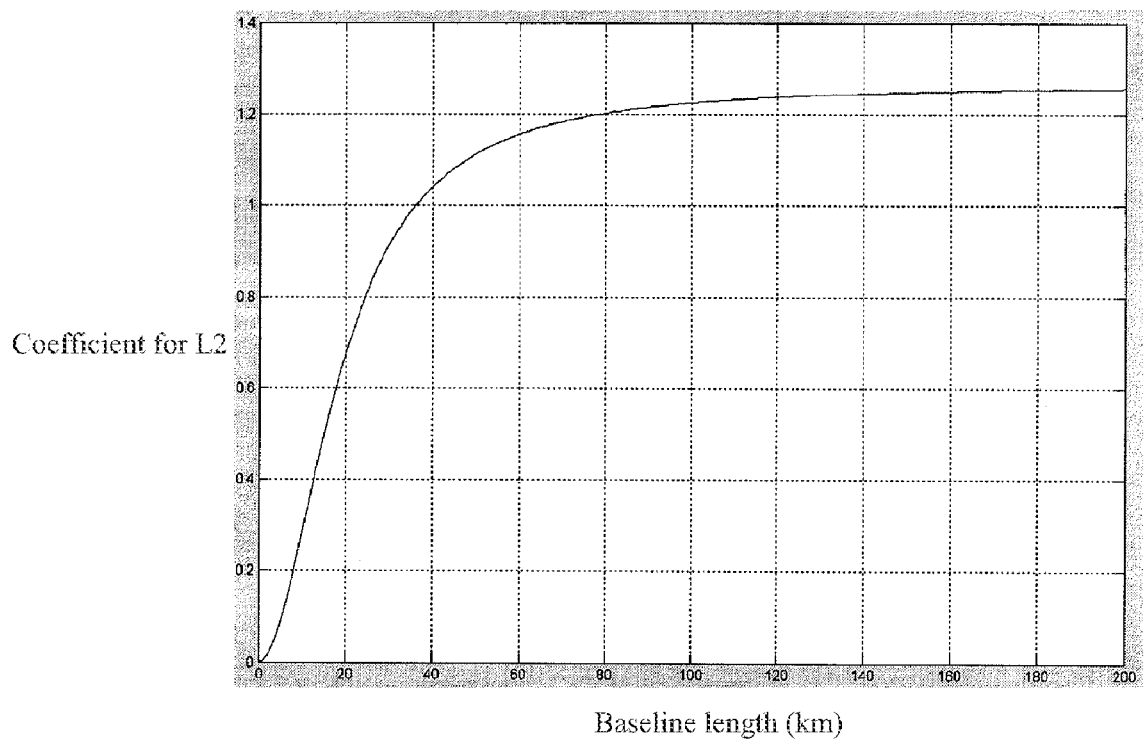
FIG. 1 is a graph of coefficients for a correlation approach according to an embodiment of the present invention.

The functional model of the present invention includes a Double Differenced Model. The double-differenced observable in units of meters can be formed as:

$$\lambda_j \Delta \phi_j - \lambda_k \Delta \phi_k = \nabla \Delta \rho_{k,j} + \lambda_j \cdot \Delta N_j - \lambda_k \cdot \Delta N_k + \Delta I/f_j^2 - \Delta I/f_k^2 + \epsilon_{\nabla \Delta \phi_{k,j}} \quad (1\text{-}1)$$

if the four reference satellites for GPS L1, GPS L2, GLONASS L1 and GLONASS L2 are chosen. In this case, four receiver clock term and inter-channel biases can be removed.

The integer ambiguity terms can also be re-arranged in the following way:

$$\lambda_j \Delta \phi_j - \lambda_k \Delta \phi_k = \nabla \Delta \rho_{k,j} + \lambda_j \cdot \nabla \Delta N_{k,j} + (\lambda_j - \lambda_k) \cdot \Delta N_k + \Delta N_k + \Delta I/f_j^2 - \Delta I/f_k^2 + \epsilon_{\nabla \Delta \phi_{k,j}} \quad (1\text{-}2)$$

For GPS carrier phase measurements, the third term on the lefthand side of equation (1-2) disappears because $\lambda_j$ and $\lambda_k$ are equal. For GLONASS carrier phase measurements, the third term, or the single-differenced integer ambiguity for the reference satellite, must be estimated prior to estimating the double-differenced integer ambiguities. The remaining errors from the third term can cause systematic model errors and may result in incorrect double-differenced ambiguity resolution, and hence degraded positioning accuracy.

An alternative approach is to form the double-differenced observable after the single-differenced observables are expressed in units of cycles as in equation 1-3, as follows:

$$\nabla \Delta \phi_{k,j} = \left( \frac{1}{\lambda_j} \Delta \rho_j - \frac{1}{\lambda_k} \Delta \rho_k \right) - (f_j - f_k) \cdot \Delta dT_k + \nabla \Delta N_{k,j} - \\ (\Delta I/(ef_j) - \Delta I/(ef_k)) + \left( \frac{1}{\lambda_j} \Delta d_j^{trop} - \frac{1}{\lambda_k} \Delta d_k^{trop} \right) + \varepsilon_{\nabla \Delta \phi} \quad (1\text{-}3)$$

where $\Delta dT_k$ are different for GPS L1, GPS L2, GLONASS L1 and GLONASS L2 signals. The differenced receiver clock bias (or inter-channel biases) cannot be eliminated in equation (1-3). The fourth term (ionospheric delay) and the fifth term (tropospheric delay) become slightly larger than in the case when the two frequencies are the same. Using GPS and GLONASS pseudo-range measurements, the difference between the two receiver clock biases is estimated. The estimate could be used to correct the second term for ambiguity resolution purposes; however, the receiver clock bias significantly degrades positioning accuracy.

In an embodiment according to the present invention, the proposed approach estimates $\Delta dT_k$ using pseudorange and the second term is corrected prior to ambiguity resolution by using equation (1-3). After fixing the ambiguity, equation (1-2) is used for position fixing where the third term on the right side of equation (1-2) is estimated. For a GPS-only positioning system, the third term on the right side of equation (1-2) is always zero because the frequencies for satellite j and k are the same. The ionosphere delay is corrected by a GPS broadcast model (Klobuchar Model). The troposphere delay is corrected by the Hopfield model known to persons of skill in the art.

Kalman Filtering State Vector

For a GPS-only RTK system, the following states in a Kalman filter have been implemented:

| Elements in State Vector | Dimension | Notes |
|---|---|---|
| Position component X (or Easting) | 1 | Mandatory |
| Velocity component X (or Easting) | 1 | Optional |
| Acceleration component X (or Easting) | 1 | Optional |
| Position component Y (or Northing) | 1 | Mandatory |
| Velocity component Y (or Northing) | 1 | Optional |
| Acceleration component Y (or Northing) | 1 | Optional |
| Position component Z (or Height) | 1 | Mandatory |
| Velocity component Z (or Height) | 1 | Optional |
| Acceleration component Z (or Height) | 1 | Optional |
| Zenith troposphere delay scale factor | 1 | Optional |
| Residual DD ionosphere delay | Nsat-1 | Optional |
| L1 DD ambiguity | Nsat-1 | Optional |
| L2 DD ambiguity | Nsat-1 | Optional |

Notes:
Nsat is the number of visible satellites.

The ionosphere delay and the zenith troposphere delay scale factor are estimated after model correction although they operate without model corrections.

Transition Matrix and Dynamic Noise

Position Parameters

When an observer is nearly stationary, such as a buoy drifting at sea, or crustal deformation monitoring, the position is assumed to be a random-walk process. In this case, three coordinate parameters are enough to employ the Kalman state vector. The transition matrix and dynamic noise are determined based on random walk model, such as equations 1-4 and 1-5:

$$\phi_{k,k-1} = e^{F(t_k - t_{k-1})} = 1 \quad (1\text{-}4)$$

$$Q_k = \sigma_u^2 (t_k - t_{k-1}) \quad (1\text{-}5)$$

which is called the Position model.

When the observer is not stationary, but moving with nearly constant velocity, the velocity is not white noise but a random-walk process. In this case, three coordinate parameters and three velocity parameters must be included in the Kalman state vector. The transition matrix and dynamic noise can be determined based on integrated random walk model, such as equations 1-6 and 1-7:

$$\phi_{k,k-1} = \begin{bmatrix} 1 & (t_k - t_{k-1}) \\ 0 & 1 \end{bmatrix} \quad (1\text{-}6)$$

$$Q_k = \sigma_u^2 \begin{bmatrix} \frac{(t_k - t_{k-1})^3}{3} & \frac{(t_k - t_{k-1})^2}{2} \\ \frac{(t_k - t_{k-1})^2}{2} & (t_k - t_{k-1}) \end{bmatrix} \quad (1\text{-}7)$$

which is called the Position-Velocity model.

The Position-Velocity model also becomes inadequate for cases where the near-constant velocity assumption is incorrect, that is, in the presence of severe accelerations. To accommodate acceleration in the process model, it is appropriate to add another degree of freedom for each position state which becomes Position-Velocity-Acceleration model or Gauss-Markov process is perhaps more appropriate than the non-stationary random walk for acceleration.

Determination of the spectral amplitude for position random processes is a best "guess" based on expected vehicle dynamics. In many vehicular applications, random perturbations are greater in the horizontal plane than in the vertical plane. These perturbations are accounted for by selecting a value for spectral amplitude which is lesser for the altitude channel, i.e., vertical plane, than for the two horizontal ones, i.e., horizontal plane.

Troposphere Delay

The troposphere delay includes a wet component and a dry component. Whereas the dry component can be modeled with a high degree of accuracy, the wet component cannot be so modeled. A solution is to scale the wet component by a scale factor, i.e., $(1+\epsilon)$. After troposphere delay modeling correction, the estimation part is $\epsilon \cdot \Delta d_{i,wet}^{trop}$. Therefore, the design matrix element is $\Delta d_{i,wet}^{trop}$ and $\epsilon$ represents the changing percentage of the wet component from the modeled value. Satellite elevation has no impact as the wet component for all satellites is scaled by the same factor for a given location. Empirically, the scale factor is modeled as a Gauss-Markov process. The transition matrix and dynamic model is then derived as in equations 1-8 and 1-9, as follows:

$$\phi_{k,k-1} = e^{-\beta_{trop}(t_k - t_{k-1})} \quad (1\text{-}8)$$

$$Q_k = \sigma_{trop}^2 (1 - e^{-2\beta_{trop}(t_k - t_{k-1})}) \quad (1\text{-}9)$$

where $1/\beta_{trop}$ is the correlation time of the troposphere wet component and $\sigma_{trop}^2$ represents the wet component changing level, both of which are functions of the baseline length and the height difference. The correlation time is set based on empirical data. The default value is set at 600 seconds. The initial variance for zenith troposphere scale factor is set as a default value of 0.1 (unitless) and dynamic noise is set as a default value of 0.1 ppm.

Ionosphere Delay Parameters

The design matrix element of an ionosphere delay parameter is a mapping function of the satellite elevation and the difference of the ionosphere zenith delays on two intersections between the receiver-satellite rays from both ends of a baseline and an equivalent ionosphere layer. However, a part of the ionosphere delay is also corrected based on the ionosphere delay model.

The ionosphere zenith delay, $\Delta d_{ion}^z$, is a function of the local time, ionosphere activities, distance and direction of two intersections of receiver-satellite rays with equivalent ionosphere layer from both ends of a baseline. The parameters of the empirical model to approximate an ionosphere delay have been broadcast by GPS satellites in real-time, which can be used for compensating for ionosphere delay. This model provides at least a 50% reduction in the single-frequency user's root mean square (RMS) due to ionosphere propagation effects. The model is widely used in a high-precision carrier phase-based RTK engine. The remaining part of the ionosphere delay is estimated in Kalman filtering as a state vector element and is empirically estimated using a Gauss-Markov model. The transition matrix and dynamic model are expressed using equations 1-10 and 1-11, as follows:

$$\phi_{k,k-1} = e^{-\beta_{ion}(t_k - t_{k-1})} \quad (1\text{-}10)$$

$$Q_k = \sigma_{ion}^2 (1 - e^{-2\beta_{ion}(t_k - t_{k-1})}) \quad (1\text{-}11)$$

where $1/\beta_{ion}$ is the correlation time of $\Delta d_{ion}^z$ after ionosphere broadcast model corrections, and $\sigma_{ion}^2$ represents variation level of the $\Delta d_{ion}^z$.

The initial standard deviation for residual ionosphere parameters is set to a default value of 0.5 ppm*distance. The dynamic noise for residual ionosphere parameters is 0.01 ppm*sqrt(distance) and the weighting function for the different satellite elevation angle is 1.0/sqrt(sqrt(cos(90−elev))).

Decorrelation Approach and Implementation

Decorrelation

The measurement and modeling errors consist of measurement noise, multipath, ionosphere delay, troposphere delay, orbit bias, inter-channel bias and antenna offset and additional error sources indicated from warning messages. These errors, or biases, are classified into two categories, e.g. distance-dependent biases and distance-independent biases, and represented by equations 2-1 and 2-2 as follows:

$$R_{non\text{-}dist}^2 = R_{noise}^2 + R_{MP}^2 + R_{wrn}^2 \quad (2\text{-}1)$$

$$R_{dist}^2 = R_{ion}^2 + R_{trop}^2 + R_{orb}^2 \quad (2\text{-}2)$$

The errors from inter-channel bias, antenna offset etc. are assumed to be cancelled through double difference. Only the errors remaining in double differenced measurements are taken into account.

Due to the distance-dependent errors such as ionosphere, troposphere and orbit bias, the L1 and L2 carrier phase measurements become highly correlated when baseline length increases and the errors are not processed independently as performed in the short range case. Therefore, the co-variance matrix between L1 and L2 must be taken into account. The detailed implementation is as follows in equations 2-3, 2-4, and 2-5:

$$V_1 = H_1 X + L_1 \quad (2\text{-}3)$$

$$V_2 = H_2 X + L_2 \quad (2\text{-}4)$$

$$D(L_1, L_2) = \begin{bmatrix} D_1 & D_{12} \\ D_{21} & D_2 \end{bmatrix} \quad (2\text{-}5)$$

where $L_1$ is pre-fit residuals for the L1 measurement vector (the difference between the computed vector and the measurement vector), $H_1$ is a design matrix, $D_1$ is a variance-covariance matrix of the L1 measurement vector, and X represents the Kalman filter state vector. $V_1$ is a post-fit residual vector. $L_2, H_2, D_2, V_2$ have similar meanings for the L2 measurement vector. $D_{12}$ or $D_{21}$ is a co-variance matrix between the L1 and L2 measurement vectors.

Due to the correlation of the L1 and L2 measurement vectors, L1 block and L2 block are not updated independently. The correlation approach orthogonalizes the L2 measurement vector and forms a new measurement vector $\overline{L}_2$ which is independent from the L1 measurement vector. The new measurement is as follows in equation 2-6:

$$\overline{V}_2 = \overline{H}_2 X + \overline{L}_2 \quad (2\text{-}6)$$

where:

$$\overline{L}_2 = L_2 - D_{21} D_1^{-1} L_1 \quad (2\text{-}7)$$

$$\overline{H}_2 = H_2 - D_{21} D_1^{-1} H_1 \quad (2\text{-}8)$$

$$\overline{D}_2 = D_2 - D_{21} D_1^{-1} D_{12}, \text{ and} \quad (2\text{-}9)$$

$$D(L_1, \overline{L}_2) = \begin{bmatrix} D_1 & 0 \\ 0 & \overline{D}_2 \end{bmatrix} \quad (2\text{-}10)$$

After the new measurement vector $\overline{L}_2$, design matrix $\overline{H}_2$ and variance matrix $\overline{D}_2$ are formed, L1 block and $\overline{L}_2$ block are updated independently. However, there is some additional computation load, as described in detail below.

Implementation

The zenith variances $R_{L1}^2$, $R_{L2}^2$ for single differenced (between receivers) L1 and L2 measurements consist of non-distance dependent errors and distance dependent errors, e.g., ionosphere delay, troposphere delay, and orbit bias, as follows in equations 2-11 and 2-12:

$$R_{L1}^2 = \frac{1}{\lambda_1^2}\left[R_{non\text{-}dist,L1}^2 + (R_{ion}^2 + R_{trop}^2 + R_{orb}^2) \cdot B^2\right] \quad (2\text{-}11)$$

$$R_{L2}^2 = \frac{1}{\lambda_2^2}\left[R_{non\text{-}dist,L2}^2 + \left(\frac{f_1^4}{f_2^4} R_{ion}^2 + R_{trop}^2 + R_{orb}^2\right) \cdot B^2\right] \quad (2\text{-}12)$$

where B is the baseline length. The correlated errors $R_{L1,L2}$ between L1 and L2 zenith is as follows in equation 2-13:

$$R_{L1,L2} = \frac{1}{\lambda_1 \lambda_2}(R_{ion}^2 + R_{trop}^2 + R_{orb}^2) \cdot \left(\frac{f_1^4}{f_2^4} R_{ion}^2 + R_{trop}^2 + R_{orb}^2\right) \cdot B^2 \quad (2\text{-}13)$$

The variance at other elevation angles is mapped by a function, e.g., equations 2-14:

$$W = \begin{cases} 1.0 + 2.5 \cdot e^{-E/15} & \text{for pseudorange} \\ 1.0 + 7.5 \cdot e^{-E/15} & \text{for carrier phase} \end{cases} \quad (2\text{-}14)$$

The variance matrix for the single difference measurement vectors is represented as follows using equation 2-15:

$$SD = \begin{bmatrix} SD_{11} & SD_{12} \\ SD_{21} & SD_{22} \end{bmatrix} \quad (2\text{-}15)$$

where $$SD_{11} = 2R_{L1}^2 \begin{bmatrix} W_1 & 0 & \ldots & 0 & 0 \\ 0 & W_2 & \ldots & 0 & 0 \\ \vdots & \vdots & \ddots & \vdots & \vdots \\ 0 & 0 & \ldots & W_{n-1} & 0 \\ 0 & 0 & \ldots & 0 & W_n \end{bmatrix} \quad (2\text{-}16)$$

$$SD_{22} = 2R_{L2}^2 \begin{bmatrix} W_1 & 0 & \ldots & 0 & 0 \\ 0 & W_2 & \ldots & 0 & 0 \\ \vdots & \vdots & \ddots & \vdots & \vdots \\ 0 & 0 & \ldots & W_{n-1} & 0 \\ 0 & 0 & \ldots & 0 & W_n \end{bmatrix} \quad (2\text{-}17)$$

-continued $$SD_{12} = SD_{21} = 2R_{L1,L2} \begin{bmatrix} W_1 & 0 & \cdots & 0 & 0 \\ 0 & W_2 & \cdots & 0 & 0 \\ \vdots & \vdots & \ddots & \vdots & \vdots \\ 0 & 0 & \cdots & W_{n-1} & 0 \\ 0 & 0 & \cdots & 0 & W_n \end{bmatrix} \quad (2\text{-}18)$$

The variance and co-variance matrix for double difference measurements (between receivers and satellites) is represented as follows using equation 2-19:

$$DD = \begin{bmatrix} DD_{11} & DD_{12} \\ DD_{21} & DD_{22} \end{bmatrix} \quad (2\text{-}19)$$

where $$DD_{11} = 2R_{L1}^2 \begin{bmatrix} W_1+W_{ref} & W_{ref} & \cdots & W_{ref} & W_{ref} \\ W_{ref} & W_2 & \cdots & W_{ref} & W_{ref} \\ \vdots & \vdots & \ddots & \vdots & \vdots \\ W_{ref} & W_{ref} & \cdots & W_{n-2}+W_{ref} & W_{ref} \\ W_{ref} & W_{ref} & \cdots & W_{ref} & W_{n-1}+W_{ref} \end{bmatrix} \quad (2\text{-}20)$$

$$DD_{22} = 2R_{L2}^2 \begin{bmatrix} W_1+W_{ref} & W_{ref} & \cdots & W_{ref} & W_{ref} \\ W_{ref} & W_2 & \cdots & W_{ref} & W_{ref} \\ \vdots & \vdots & \ddots & \vdots & \vdots \\ W_{ref} & W_{ref} & \cdots & W_{n-2}+W_{ref} & W_{ref} \\ W_{ref} & W_{ref} & \cdots & W_{ref} & W_{n-1}+W_{ref} \end{bmatrix} \quad (2\text{-}21)$$

$$DD_{12} = DD_{12} = \quad (2\text{-}22)$$

$$2R_{L1,L2} \begin{bmatrix} W_1+W_{ref} & W_{ref} & \cdots & W_{ref} & W_{ref} \\ W_{ref} & W_2 & \cdots & W_{ref} & W_{ref} \\ \vdots & \vdots & \ddots & \vdots & \vdots \\ W_{ref} & W_{ref} & \cdots & W_{n-2}+W_{ref} & W_{ref} \\ W_{ref} & W_{ref} & \cdots & W_{ref} & W_{n-1}+W_{ref} \end{bmatrix}$$

Equation 2-23 for calculating $DD_{12}DD_{11}^{-1}$ is:

$$DD_{12}DD_{11}^{-1} = \frac{2R_{L1,L2}}{2R_{L1}^2} \begin{bmatrix} 1 & 0 & \cdots & 0 & 0 \\ 0 & 1 & \cdots & 0 & 0 \\ \vdots & \vdots & \ddots & \vdots & \vdots \\ 0 & 0 & \cdots & 1 & 0 \\ 0 & 0 & \cdots & 0 & 1 \end{bmatrix} \quad (2\text{-}23)$$

Hence, computation is simplified to a coefficient associated with a preset setting and baseline length as in equation 2-24 as follows:

$$Coef = \frac{2R_{L1,L2}}{2R_{L1}^2} == \frac{\left(\frac{f_1^4}{f_2^4}R_{ion}^2 + R_{trop}^2 + R_{orb}^2\right) \cdot B^2}{R_{non\text{-}dist,L1}^2 + (R_{ion}^2 + R_{trop}^2 + R_{orb}^2) \cdot B^2} \cdot \frac{\lambda_1}{\lambda_2} \quad (2\text{-}24)$$

There are three special cases for the coefficient factor, each of which is described in detail below.

Case 1: Ionosphere-Free Combination

Assuming there is no non-distance dependent error, no troposphere delay and no orbit bias ($R_{non\text{-}dist,L1}^2=0$, $R_{trop}^2=0$, $R_{orb}^2=0$), Coef of equation 2-24 is as follows:

$$Coef = \frac{\sqrt{R_{ion}^2 \cdot \frac{f_1^4}{f_2^4} R_{ion}^2 \cdot B^2}}{R_{ion}^2 \cdot B^2} \cdot \frac{\lambda_1}{\lambda_2} = \frac{\lambda_2}{\lambda_1} = 1.283$$

This means the orthogonalized measurement $$\left(L2(\text{cycle}) - \frac{\lambda_2}{\lambda_1} * L1(\text{cycle})\right)$$

is the ionosphere free combination.

Case 2: L1 and L2 Independent Measurements

Assuming the distance-dependent biases are ignored, ($R_{ion}^2=0$, $R_{orb}^2=0$ and $R_{trop}^2=0$), Coef of equation 2-24 is as follows:

Coef=0

This means the orthogonalized measurement is the L2 measurement.

Case 3: Geometry-Free Combination

Assuming the non-distance dependent error and ionosphere delay are zero $R_{non\text{-}dist,L1}^2=0$, $R_{non\text{-}dist,L2}^2=0$ and $R_{trop}^2=0$), frequency independent errors from distance-dependent errors such orbit errors and troposphere delay make up the dominator. Coef of equation 2-24 is as follows:

$$Coef = \frac{\lambda_1}{\lambda_2} = 0.7792$$

This means the orthogonalized measurement will be $$L2(\text{cycle}) - \frac{\lambda_1}{\lambda_2} * L1(\text{cycle}),$$

which is the geometry free combination.

The decorrelation approach has been implemented in a Z-Xtreme-type and Z-Max-type receiver and the inventors have observed that the decorrelation approach selects the best L1 and L2 combination according to preset settings. Based on the decorrelation approach, any combination between L1 and L2 is easily implemented as follows from equation 2-25:

The new combination is formed as:

$$\tilde{V}_2 = \tilde{H}_2 X + \tilde{L}_2 \quad (2\text{-}25)$$

where $$\tilde{L}_2 = L_2 - \alpha L_1, \quad (2\text{-}26)$$

$$\tilde{H}_2 = H_2 - \alpha H_1, \quad (2\text{-}27)$$

$$\tilde{D}_2 = (R_{L2}^2 + \alpha^2 R_{L1}^2 - 2\alpha \quad (2\text{-}28)$$

-continued $$R_{L1,L2} = \begin{bmatrix} W_1 + W_{ref} & W_{ref} & \cdots & W_{ref} & W_{ref} \\ W_{ref} & W_2 & \cdots & W_{ref} & W_{ref} \\ \vdots & \vdots & \ddots & \vdots & \vdots \\ W_{ref} & W_{ref} & \cdots & W_{n-2} + W_{ref} & W_{ref} \\ W_{ref} & W_{ref} & \cdots & W_{ref} & W_{n-1} + W_{ref} \end{bmatrix}$$

However, the correlation between L1 and $\tilde{L}_2$ has not been taken into account although all combination options are implemented based on the subroutine for correlation approach.

$$\alpha = \begin{cases} 1 & \text{widelane combination} \\ \lambda_1/\lambda_2 & \text{geometry-free combination} \\ \lambda_2/\lambda_1 & \text{ionosphere-free combination} \\ 0 & \text{L2 independent measurement} \\ R_{L1,L2}/R_{L1}^2 & \text{the correlation approach} \end{cases} \quad (2\text{-}29)$$

Figure 2:
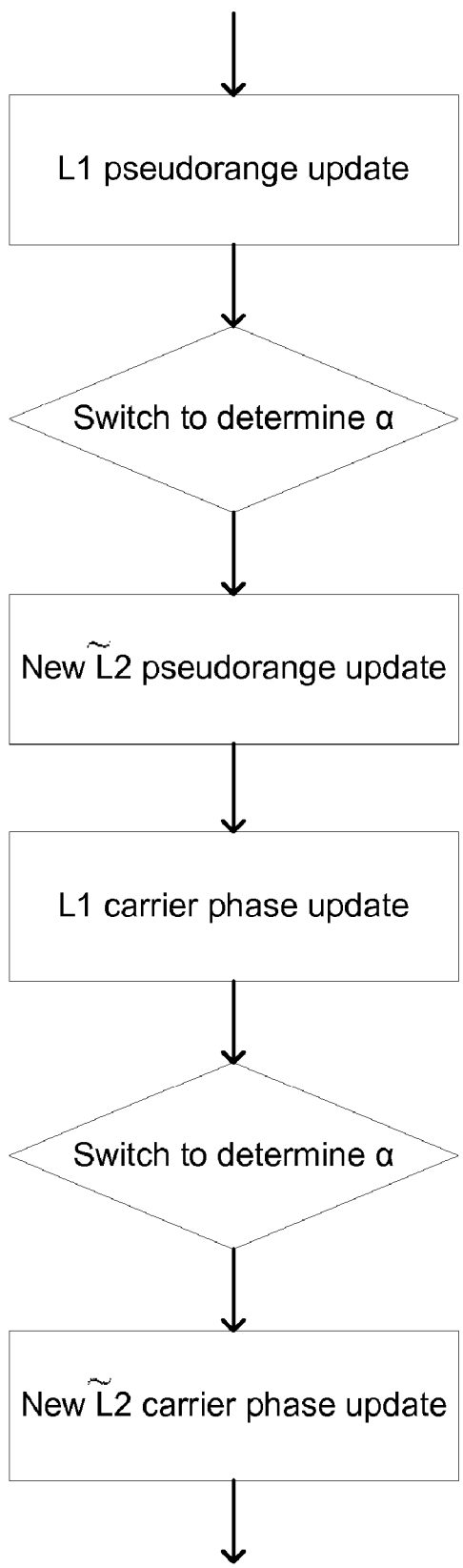
FIG. 2 is a flow diagram of a decorrelation approach according to an embodiment of the present invention.

The coefficients for the decorrelation approach have been plotted in FIG. 1. The Kalman filtering update for the decorrelation approach is illustrated in FIG. 2, wherein the switch to determine α is determined based on equation (2-29).

Stochastic Model

The measurement and modeling errors consist of measurement noise, multipath, ionosphere delay, troposphere delay and orbit bias as described by equations 2-11 and 2-12 above.

The remaining errors based on the ionosphere delay, troposphere and orbit bias are represented by distance-dependent functions for their standard deviations, eg. 0.5 ppm, 10-4*HeightDiff+2 ppm, and 0.1 ppm, respectively. If the ionosphere parameters are estimated in the Kalman filtering state vector, the standard deviation for ionosphere delay is scaled by a factor, e.g., 1−dt/dTIono, where dt is the time shift from filtering start, dTIono is the time to turn off ionosphere. If the troposphere scale parameter is estimated, or a default standard troposphere model is applied, troposphere errors are turned off.

By default, ionosphere (one for each Sat) and troposphere (one scale parameter) are modeled in Kalman filtering. In correspondence with the above paragraph, the troposphere term is not applied to the stochastic model. The ionosphere term is applied to the stochastic model even when the ionosphere is modeled. There is not any theoretical foundation behind the formula 1−dt/dTIono; this solution is heuristic and the inventors have found that the formula provides good results. Here, dt is the elapsed time from starting estimation given ionosphere, dTIono is set between from 200 seconds to 1,000 seconds. The default value is set as 600 seconds.

The standard deviation for constant errors from multipath and noise depends on a multipath template index. The index is defined as a value from 1 to 3 representing the multipath status (1=minor multipath, 2=medium, and 3=strong multipath).

The default standard deviation for medium multipath have a default value of 2.25 meters for pseudo-range and 0.05 cycles for carrier phase. The mapping function is determined by the empirical exponential function of equation 2-14.

Figure 3:
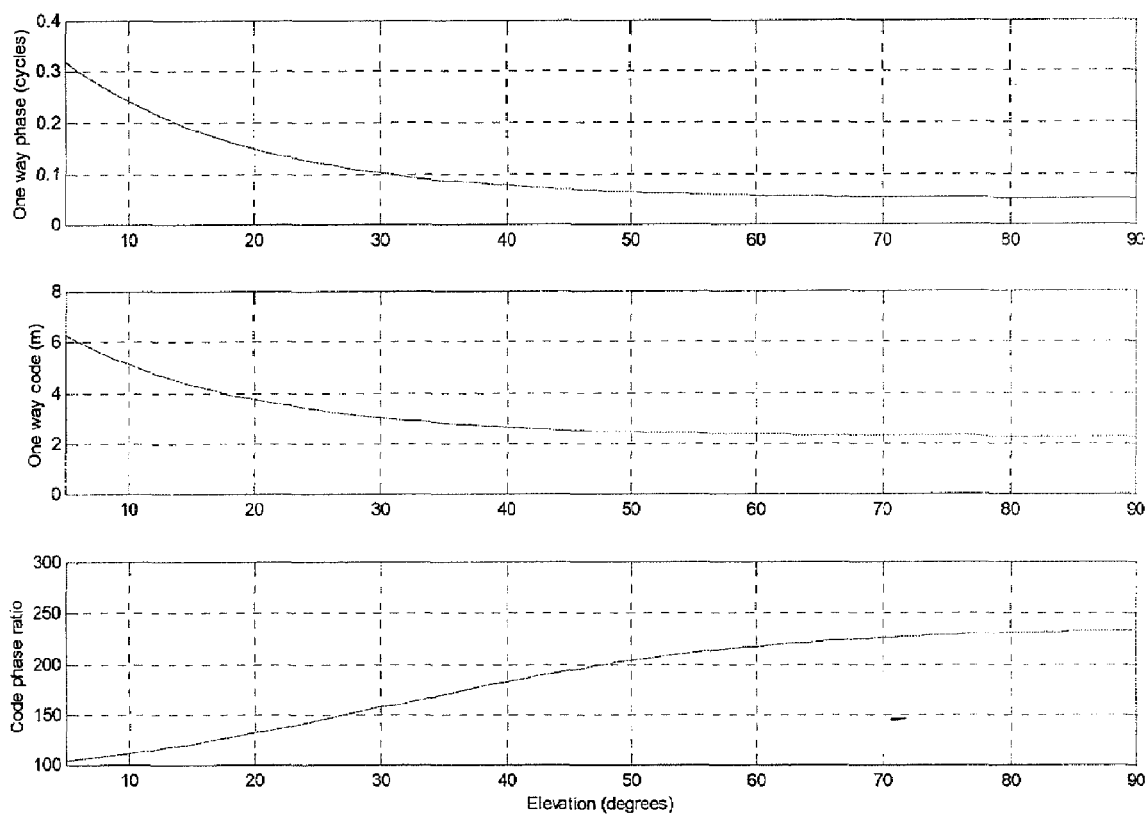
FIG. 3 is a graph of standard deviation for carrier phase and pseudorange according to an embodiment of the present invention.

The standard deviation for non-distance dependent errors is depicted in FIG. 3 when the zenith default standard deviations are set at 0.05 cycle for phase and 2.25 meters for code.

Ambiguity Resolution Validation

The ratio smoothing algorithm and ambiguity stability function are only used for the long range widelane/ionosphere-free combination. Both functions increase positioning reliability and increase time-to-first-fix.

Instant Ambiguity Fixing

The methods claimed in the pending patent applications entitled, "Accurate and Fast RTK" and "Enhanced Real Time Kinematics Determination Method and Apparatus" and having application Ser. Nos. 10/610,544 and 10/610,541, respectively, have been used for instant ambiguity fixing for baselines shorter than 10 km.

Ratio Smoothing Algorithm for Long Range Applications $\tilde{R}atio=Ratio+\tilde{R}atio*(N-1)/N$ where N is the width of the moving window (1 second per km, if the baseline length is longer than 10 km). Both $\tilde{R}atio$ and Ratio, described in more detail in co-pending U.S. patent application Ser. Nos. 10/610,544 and 10/610,541, are required to pass validation tests for ambiguity fixing.

A ratio smoothing algorithm increases reliability for long range; however, the same algorithm decreases instant-fix significantly.

Ambiguity Repeatability Function for Long Range

The ambiguity repeatability check is for determining whether all double-difference ambiguities remain the same for N continuous epochs, e.g., 30, and whether all passed the ratio test mentioned above. If the ambiguity repeatability check is passed, the ambiguity is fixed. This function has a problem when cycle slips occur. The ambiguity stability counter is defined as a counter to count how many continuous epochs with the same ambiguity set or another ambiguity set with a difference larger than 50 cycles. This means that the ambiguity stability counter is not reset if the ambiguity difference is larger than 50 cycles. In this manner, the influence of cycle slips is minimized. This is reasonable because double differenced (DD) ambiguity is impossibly fixed to a wrong integer with such large difference values. However, the DD ambiguity stability counter is reset to a value of 1 if the ambiguity difference is not zero and less than 50 cycles for any given satellite pair.

The Ambiguity Repeatability Check increases reliability for long range applications; however, the same function makes instant-fix impossible.

Partial Fixing Scheme

The partial fixing scheme has been implemented based on the functional model improvement by removing measurements and ambiguity searching adaptation by removing ambiguity, as described in co-pending U.S. patent application Ser. Nos. 10/610,544 and 10/610,541.

Process Flow

Figure 4:
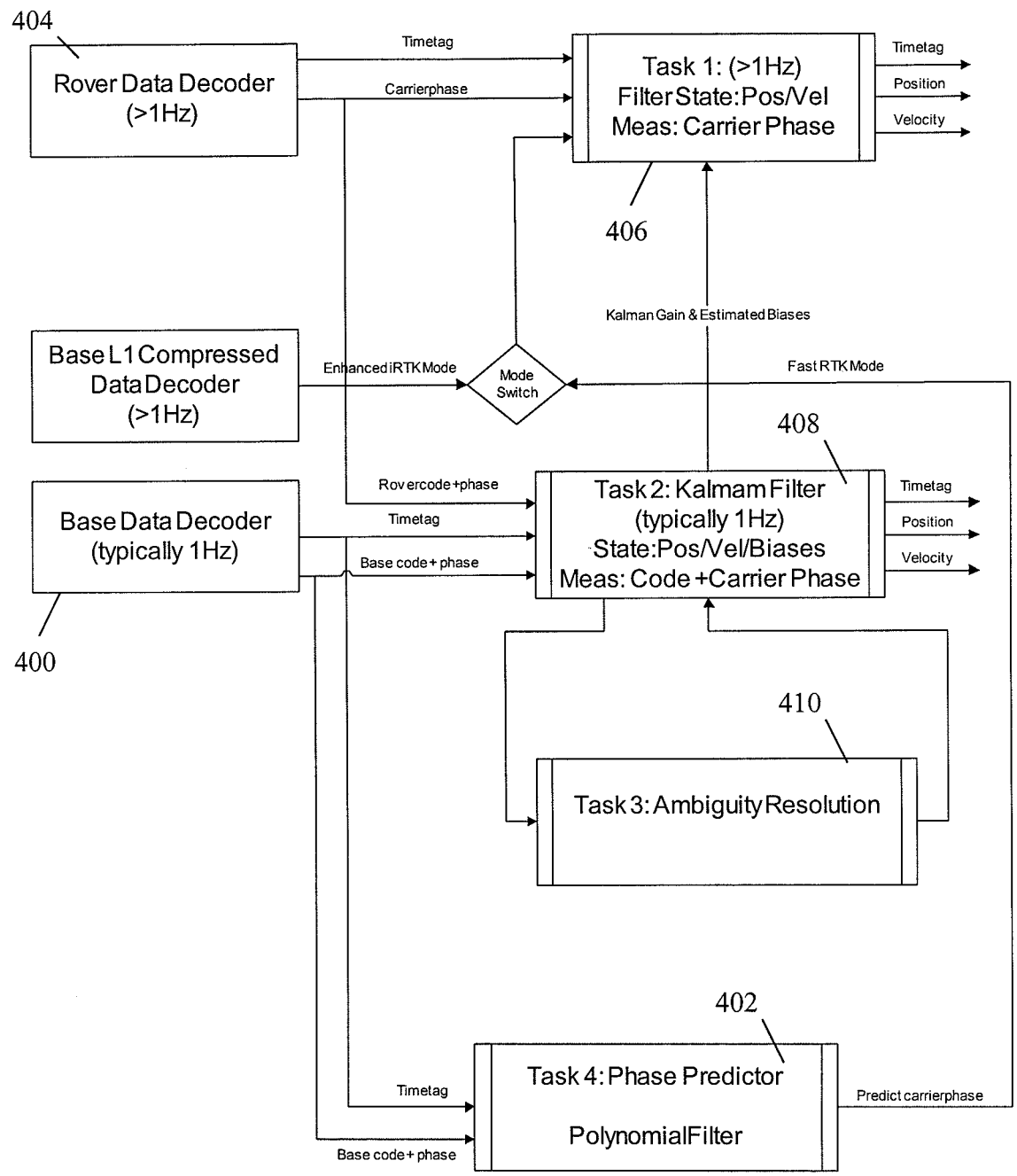
FIG. 4 is a high level flow diagram of a process according to an embodiment of the present invention.

FIG. 4 depicts the process flow of an RTK method according to an embodiment of the present invention. Low rate, nominally 1 Hz, base station measurements output from a base data decoder 400 are output to a polynomial fitting function executed in a phase predictor process 402, e.g. second order or higher order polynomial, and a Kalman filter process 408. Base data decoder 400 decodes raw GPS measurements received from a base GPS receiver (not shown). The sampling rate (or update rate) of base data decoder 400 is nominally 1 Hz. Higher sampling rates may be used with a proportional increase in cost and baud rate for the data link. In one embodiment of the present invention, the update rate does not exceed 1 Hz. If a higher sampling rate is required, an embodiment according to the description embodied in co-pending patent application titled, "Enhanced Rapid Real-Time Kinematic Determination Method and Apparatus," by the present inventors and assigned to the present assignee would be used.

In order to reduce the position update time delay, phase predictor process 402 predicts corrections for the position calculation using available corrections transmitted from the base GPS receiver as decoded and output from base data decoder 400 in conjunction with polynomial filtering. The positioning accuracy degrades depending on the length of the predicted period.

Kalman filter process 408, described in detail below with reference to FIG. 5, calculates optimal solutions, i.e. position and/or velocity, based on currently available measurements from base data decoder 400 and rover data decoder 404. An ambiguity resolution process 410 is a part of Kalman filter process 408 and is described in detail below with reference to FIG. 5.

A rover data decoder 404 decodes raw GPS measurements and ephemeris received from the rover GPS receiver (not shown) and provides time tagged carrier phase measurements to a carrier phase process 406. The sampling rate (or update rate) of rover data decoder 404 can be up to 10 Hz or higher.

Output estimated polynomial parameters from phase predictor 402 are used by carrier phase process 406 to predict the base station measurement at a rate matching the RTK update rate, typically 10 Hz or higher. The RTK solution latency is primarily determined by the rover measurement data collection time and the RTK position computation time. The base station prediction time is a negligible delay. Typically, RTK solution latency is less than 20 milliseconds depending on microprocessor speed.

For embodiments requiring an update rate in time-tagged mode of 1 Hz or lower, carrier phase process 406 uses the output from Kalman filter 408 to calculate and output the rover GPS receiver position and/or velocity. For embodiments requiring an update rate in RTK mode of 1 Hz or lower, carrier phase process 406 uses the most recent measurements from rover data decoder 404 and the predicted correction output from phase predictor 402 to calculate and output the most recent position and/or velocity of the rover GPS receiver.

To reduce the RTK position computation time, only an L1 carrier phase measurement output from a rover data decoder 404 is used. The rover L1 carrier phase measurement and the predicted base station L1 carrier phase measurement output from phase predictor 402 are then used to derive L1 double difference measurements in 406. The estimated L1 integer ambiguities, residual ionosphere delay, residual troposphere delay and other bias parameters are used to correct the double difference measurement in 406. The corrected double difference measurement is output into a least squares (LSQ) estimator to calculate a rover position in 406. The velocity is calculated in a similar manner using rover L1 Doppler measurements and predicted base L1 carrier phase rate. Because of the requirement of base station measurement prediction, the RTK solution accuracy is degraded in comparison to a matched time-tag RTK solution. With Selective Availability (S/A), the rate of degradation increases due to the inability to predict S/A. Selective availability is known to persons of skill in the art and refers to the intentional degradation of the absolute positioning performance capabilities of the GPS for civilian use accomplished by artificial "dithering" of satellite clock error.

Figure 5:
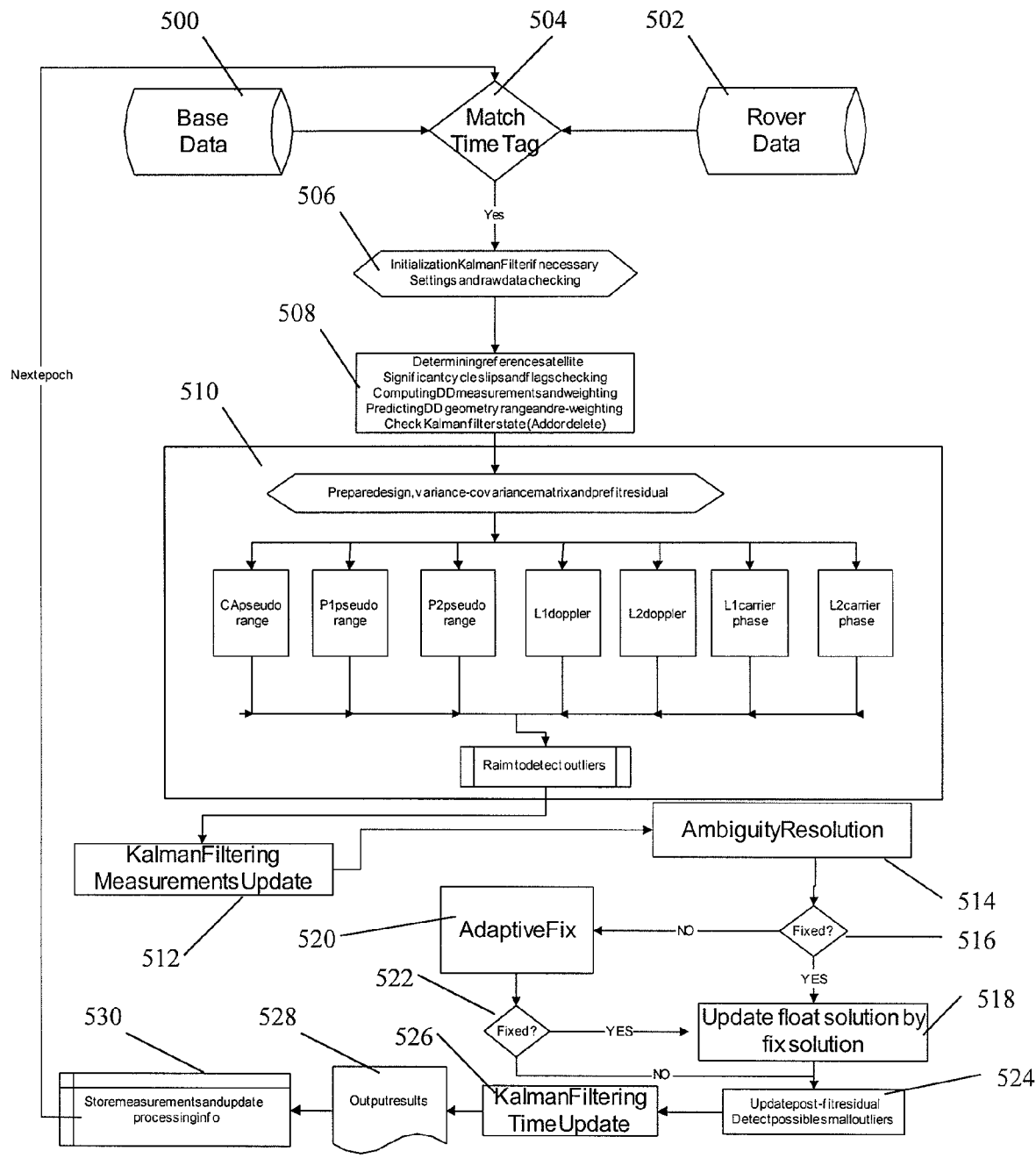
FIG. 5 is a flow diagram of a portion of the FIG. 4 flow diagram according to an embodiment of the present invention.

With reference to FIG. 5, details of Kalman filter process 408 and ambiguity resolution process 410 in FIG. 4 are now described. Data from both a base GPS receiver (not shown) and a rover GPS receiver (not shown) is received, decoded, and output by base data decoder 400 and rover data decoder 404, respectively. Base data 500 and rover data 502 time tags are matched in match time tag step 504, thereby matching the time when the respective measurements were made.

After the time tags are matched, the matched data output from match time tag step 504 is input to a Kalman filter. In step 506, if the matched data output is in the first epoch or if a reset of the Kalman filter is required, the Kalman filter is initialized in step 506. In step 508, a reference satellite is selected to determine the double differenced measurement. Further, cycle slips are checked using cycle slip flags and a stochastic model is calculated.

The flow proceeds to step 510 for the preparation of the design matrix, variance-covariance matrix (stochastic model) and calculation of pre-fit residuals for all measurements, e.g. C/A pseudo-range, P1 pseudo-range, P2 pseudo-range, L1 Doppler, L2 Doppler, L1 carrier phase and L2 carrier phase measurements. The output of the pre-fit residual calculation is input to a Receiver Autonomous Integrity Monitoring (RAIM) algorithm to detect outliers. RAIM is a form of receiver self-checking using redundant pseudo-range observations to detect if a problem with any of the measurements exists.

The output of step 510 is provided as input to a Kalman filter measurement update step 512 to sequentially filter all measurements and provide filtered output measurements to an ambiguity resolution step 514. FIG. 2 illustrates the detailed procedure implementing the decorrelation approach in Step 512. The update step provides the optimal estimation results using all available measurements.

The validation criteria are calculated using the above-described method in step 514 and a determination of whether the integer ambiguities can be fixed or not is performed in step 516. If the step 516 determination is positive (the integer ambiguities can be fixed), the float solution is updated to the fix solution in step 518. If the step 516 determination is negative (the integer ambiguities cannot be fixed), the above-described adaptive fix procedure is performed in step 520 to attempt to fix ambiguities and a second determination of whether the integer ambiguities can be fixed or not is performed in step 522. If the step 522 determination is positive (the integer ambiguities can be fixed), the float solution is updated to the fix solution in step 518 and the flow proceeds to step 524 wherein the post-fit residuals are updated and possible outliers are detected. If the step 522 determination is negative (the integer ambiguities cannot be fixed), the flow proceeds to step 524 described above.

The output of step 524 is provided to a Kalman filtering time update 526, which is a Kalman filtering prediction step. In step 528, all necessary information is outputted and in step 530 the measurements are stored and the processing information is updated based on the above-described method. The flow proceeds to process the next epoch of data returning to step 504.

In coordination with the above-described technique, an embodiment of the present invention provides an improved method of and apparatus for an improved decorrelation and parameter tuning capability for determining real time kinematics.

Figure 6:
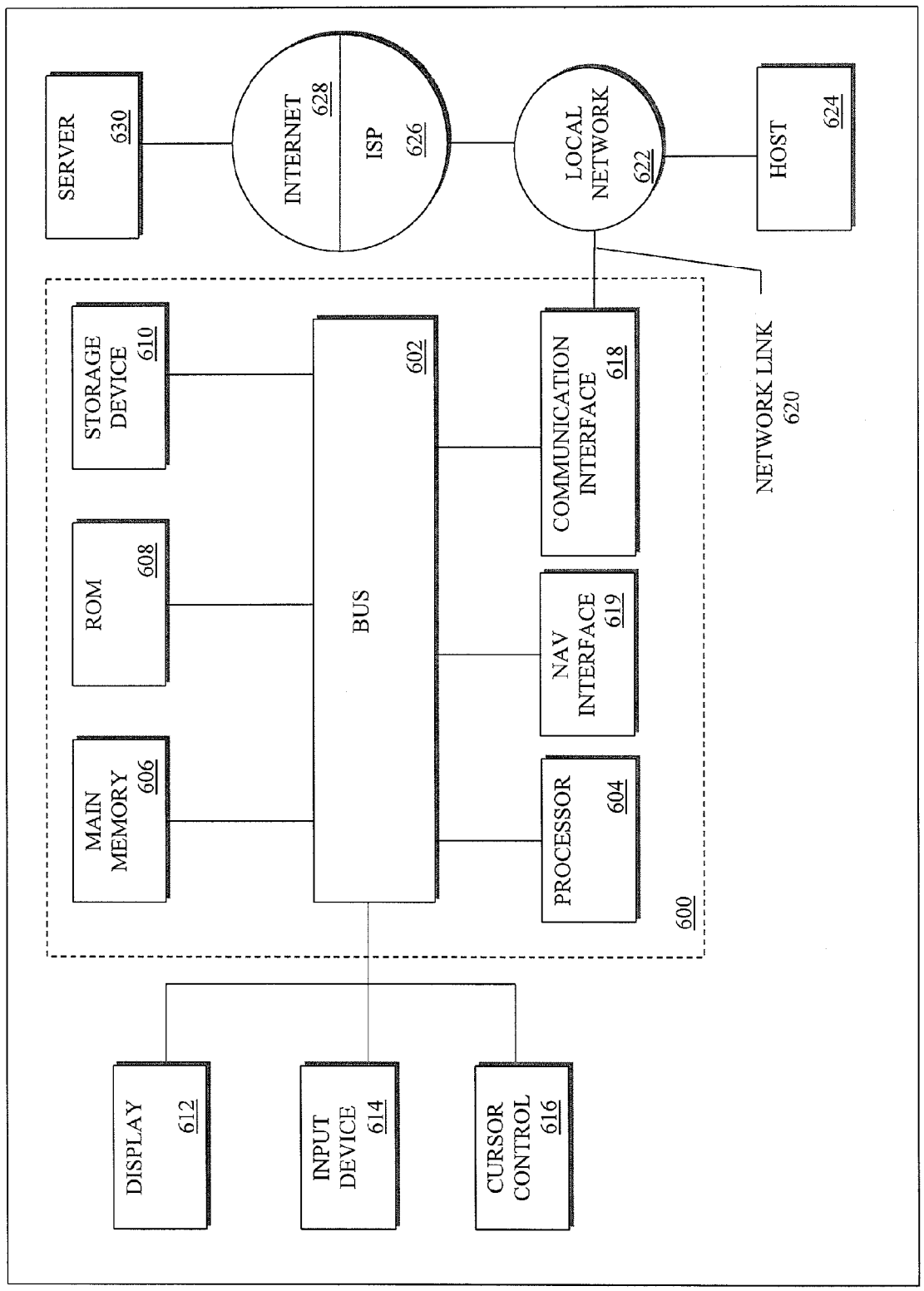
FIG. 6 is a computer system on which an embodiment of the present invention may be used.

FIG. 6 is a block diagram illustrating an exemplary computer 600 upon which an embodiment of the invention may be implemented. The present invention is usable with currently available handheld and embedded devices, e.g. GPS receivers, and is also applicable to personal computers, mini-mainframes, servers and the like.

Computer 600 includes a bus 602 or other communication mechanism for communicating information, and a processor 604 coupled with the bus 602 for processing information. Computer 600 also includes a main memory 606, such as a random access memory (RAM) or other dynamic storage device, coupled to the bus 602 for storing GPS data signals according to an embodiment of the present invention and instructions to be executed by processor 604. Main memory 606 also may be used for storing temporary variables or other intermediate information during execution of instructions to be executed by processor 604. Computer 600 further includes a read only memory (ROM) 608 or other static storage device coupled to the bus 602 for storing static information and instructions for the processor 604. A storage device 610 (dotted line), such as a compact flash, smart media, or other storage device, is optionally provided and coupled to the bus 602 for storing instructions.

Computer system 600 may be coupled via the bus 602 to a display 612, such as a cathode ray tube (CRT) or a flat panel display, for displaying an interface to the user. An input device 614, including alphanumeric and function keys, is coupled to the bus 602 for communicating information and command selections to the processor 604. Another type of user input device is cursor control 616, such as a mouse, a trackball, or cursor direction keys for communicating direction information and command selections to processor 604 and for controlling cursor movement on the display 612. This input device typically has two degrees of freedom in two axes, a first axes (e.g., x) and a second axis (e.g., y) allowing the device to specify positions in a plane.

The invention is related to the use of computer 600, such as the depicted computer of FIG. 6, to perform accurate, real-time, kinematics determination. According to one embodiment of the invention, data signals are received via a navigation interface 619, e.g. a GPS receiver, and processed by computer 600 and processor 604 executes sequences of instructions contained in main memory 606 in response to input received via input device 614, cursor control 616, or communication interface 618. Such instructions may be read into main memory 606 from another computer-readable medium, such as storage device 610. A user interacts with the system via an application providing a user interface displayed on display 612.

However, the computer-readable medium is not limited to devices such as storage device 610. For example, the computer-readable medium may include a floppy disk, a flexible disk, hard disk, magnetic tape, or any other magnetic medium, a compact disc-read only memory (CD-ROM), any other optical medium, punch cards, paper tape, any other physical medium with patterns of holes, a random access memory (RAM), a programmable read only memory (PROM), an erasable PROM (EPROM), a Flash-EPROM, any other memory chip or cartridge, a carrier wave embodied in an electrical, electromagnetic, infrared, or optical signal, or any other medium from which a computer can read. Execution of the sequences of instructions contained in the main memory 606 causes the processor 604 to perform the process steps described above. In alternative embodiments, hard-wired circuitry may be used in place of or in combination with computer software instructions to implement the invention. Thus, embodiments of the invention are not limited to any specific combination of hardware circuitry and software.

Computer 600 also includes a communication interface 618 coupled to the bus 602 and providing two-way data communication as is known in the art. For example, communication interface 618 may be an integrated services digital network (ISDN) card, a digital subscriber line (DSL) card, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals which carry digital data streams representing various types of information. Of particular note, the communications through interface 618 may permit transmission or receipt of instructions and data to be processed according to the above method. For example, two or more computers 600 may be networked together in a conventional manner with each using the communication interface 618.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals which carry digital data streams. The signals through the various networks and the signals on network link 620 and through communication interface 618, which carry the digital data to and from computer 600, are exemplary forms of carrier waves transporting the information.

Computer 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer 600 may obtain application code in the form of a carrier wave.

Figure 7:
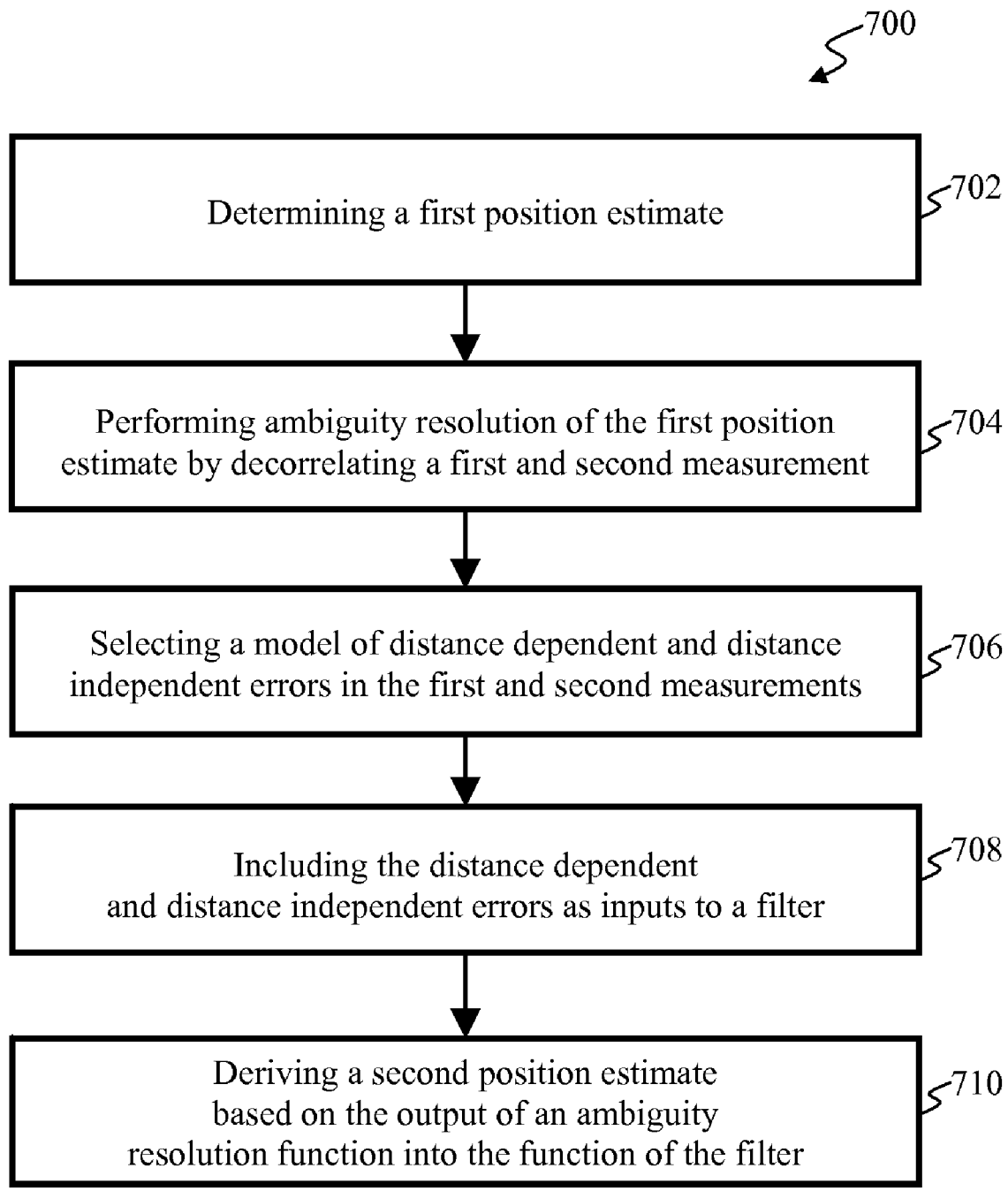
FIG. 7 is a high level flow diagram of a process according to an embodiment of the present invention.

FIG. 7 illustrates a high level flow diagram of a process 700 in accordance with one embodiment of the present invention. At the step 702, a first position estimate is determined. At step 704, ambiguity resolution of the first position estimate is performed by decorrelating a first and second measurement. At step 706, a model of distance dependent and distance independent errors in the first and second measurements is selected. At step 708, the distance dependent and distance independent errors are included as inputs to a filter. At step 710, a second position estimate based on the output of an ambiguity resolution function into the function of the filter is derived.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer implemented method of providing improved real time kinematics determination, comprising:

determining, via a computing device, a first position estimate;

performing an ambiguity resolution function having an output that provides an ambiguity resolution of the first position estimate by decorrelating first and second measurements, wherein the first and second measurements are inputs to the ambiguity resolution function;

selecting a model of distance dependent and distance independent errors in the first and second measurements; and deriving a second position estimate as an output from a filter by inputting into the filter the output of the ambiguity resolution function and the distance dependent and distance independent errors.

2. The method as claimed in claim 1, wherein the filter is a Kalman filter, the method further comprising:

based on the model, calculating a double differenced variance matrix; and updating the Kalman filter with the calculated variance matrix.

3. The method as claimed in claim 1, wherein the first and second measurements are decorrelated using the function:

$$\tilde{V}_2 = \tilde{H}_2 X + \tilde{L}_2,$$

wherein $$\tilde{L}_2 = L_2 - \alpha L_1;$$

$$\tilde{H}_2 = H_2 - \alpha H_1;$$

$$\tilde{D}_2 = (R_{L2}^2 + \alpha^2 R_{L1}^2 - 2\alpha R_{L1,L2}) \begin{bmatrix} W_1 + W_{ref} & W_{ref} & \cdots & W_{ref} & W_{ref} \\ W_{ref} & W_2 & \cdots & W_{ref} & W_{ref} \\ \vdots & \vdots & \ddots & \vdots & \vdots \\ W_{ref} & W_{ref} & \cdots & W_{n-2} + W_{ref} & W_{ref} \\ W_{ref} & W_{ref} & \cdots & W_{ref} & W_{n-1} + W_{ref} \end{bmatrix};$$

$$\alpha = \begin{cases} 1 \\ \lambda_1/\lambda_2 \\ \lambda_2/\lambda_1 \\ 0 \\ R_{L1,L2}/R_{L1}^2 \end{cases} ; \text{ and}$$

wherein $L_1$ represents a first measurement of a first signal with wavelength $\lambda_1$;

$L_2$ represents a second measurement of a second signal with wavelength $\lambda_2$;

$\alpha$ represents the model, the model $\alpha$ selected from $\alpha=\lambda_1/\lambda_2$ for a geometry-free combination, $\alpha=\lambda_2/\lambda_1$ for an ionosphere-free combination, $\alpha=1$ for a widelane combination, $\alpha=0$ for an $L_2$ independent measurement, and $\alpha=R_{L1,L2}/R_{L1}^2$ for the correlation approach;

$V_2$ represents the post-fit residual vector of $L_2$;

$H_1$ represents a design matrix of $L_1$;

$H_2$ represents a design matrix of $L_2$;

X represents a Kalman filter state vector;

$D_2$ represents a variance-covariance matrix of $L_2$;

$\tilde{V}_2, \tilde{H}_2, \tilde{L}_2$, and $\tilde{D}_2$ represent orthogonalized versions of $V_2$, $H_2$, $L_2$, and $D_2$, respectively;

$R_{L1}^2$ represents zenith variance for single differenced $L_1$ measurements;

$R_{L2}^2$ represents zenith variance for single differenced $L_2$ measurements;

each W is: $W_n = 1.0 + 7.5e^{-E/15}$ wherein E represents the elevation angle of a satellite n in a plurality of satellites, wherein n represents a satellite ordinal in the plurality of satellites;

$W_{ref}$ represents a reference satellite of the plurality of satellites; and wherein after the new values of $\tilde{V}_2, \tilde{H}_2, \tilde{L}_2$, and $\tilde{D}_2$ are formed, $L_1$ and $L_2$ are updated independently, thereby decorrelating $L_1$ and $L_2$.

4. The method as claimed in claim 1, wherein at least one of a ratio smoothing function and an ambiguity stability function are used if a baseline is 10 kilometers or greater.

5. The method as claimed in claim 4, wherein the ratio smoothing function is:

$\tilde{R}atio = Ratio + \tilde{R}atio * (N-1)/N$ where N is the width of the moving window.

6. The method as claimed in claim 4, wherein the ambiguity stability function includes:

incrementing a counter for each epoch in which double differenced ambiguities remain the same; and if the double differenced ambiguities are not zero and less than 50 epochs are counted, resetting the counter.

7. A computer readable medium comprising:

at least one sequence of machine executable instructions in machine form, wherein execution of the instructions by a tangible processor perform a method comprising:

determining a first position estimate;

performing an ambiguity resolution function having an output that provides an ambiguity resolution of the first position estimate by decorrelating first and second measurements, wherein the first and second measurements are inputs to the ambiguity resolution function;

selecting a model of distance dependent and distance independent errors in the first and second measurements; and deriving a second position estimate as an output from a filter by inputting into the filter the output of the ambiguity resolution function and the distance dependent and distance independent errors.

8. The method as claimed in claim 7, wherein the filter is a Kalman filter, the method further comprising:

based on the model, calculating a double differenced variance matrix; and updating the Kalman filter with the calculated variance matrix.

9. The method as claimed in claim 7, wherein the first and second measurements are decorrelated using the function:

$$\tilde{V}_2 = \tilde{H}_2 X + \tilde{L}_2,$$

wherein $$\tilde{L}_2 = L_2 - \alpha L_1;$$

$$\tilde{H}_2 = H_2 - \alpha H_1;$$

$$\tilde{D}_2 = (R_{L2}^2 + \alpha^2 R_{L1}^2 -$$

-continued $$2\alpha R_{L1,L2}) \begin{bmatrix} W_1 + W_{ref} & W_{ref} & \ldots & W_{ref} & W_{ref} \\ W_{ref} & W_2 & \ldots & W_{ref} & W_{ref} \\ \vdots & \vdots & \ddots & \vdots & \vdots \\ W_{ref} & W_{ref} & \ldots & W_{n-2} + W_{ref} & W_{ref} \\ W_{ref} & W_{ref} & \ldots & W_{ref} & W_{n-1} + W_{ref} \end{bmatrix};$$

$$\alpha = \begin{cases} 1 \\ \lambda_1/\lambda_2 \\ \lambda_2/\lambda_1 \\ 0 \\ R_{L1,L2}/R_{L1}^2 \end{cases}; \text{ and}$$

wherein $L_1$ represents a first measurement of a first signal with wavelength $\lambda_1$;

$L_2$ represents a second measurement of a second signal with wavelength $\lambda_2$;

$\alpha$ represents the model, the model $\alpha$ selected from $\alpha=\lambda_1/\lambda_2$ for a geometry-free combination, $\alpha=\lambda_2/\lambda_1$ for an ionosphere-free combination, $\alpha=1$ for a widelane combination, $\alpha=0$ for an $L_2$ independent measurement, and $\alpha=R_{L1,L2}/R_{L1}^2$ for the correlation approach;

$V_2$ represents the post-fit residual vector of $L_2$;

$H_1$ represents a design matrix of $L_1$;

$H_2$ represents a design matrix of $L_2$;

X represents a Kalman filter state vector;

$D_2$ represents a variance-covariance matrix of $L_2$;

$\tilde{V}_2, \tilde{H}_2, \tilde{L}_2,$ and $\tilde{D}_2$ represent orthogonalized versions of $V_2, H_2, L_2,$ and $D_2$, respectively;

$R_{L1}^2$ represents zenith variance for single differenced $L_1$ measurements;

$R_{L2}^2$ represents zenith variance for single differenced $L_2$ measurements;

each W is: $W_n=1.0+7.5e^{-E/15}$ wherein E represents the elevation angle of a satellite n in a plurality of satellites, wherein n represents a satellite ordinal in the plurality of satellites;

$W_{ref}$ represents a reference satellite of the plurality of satellites; and wherein after the new values of $\tilde{V}_2, \tilde{H}_2, \tilde{L}_2,$ and $\tilde{D}_2$ are formed, $L_1$ and $L_2$ are updated independently, thereby decorrelating $L_1$ and $L_2$.

10. The method as claimed in claim 7, wherein at least one of a ratio smoothing function and an ambiguity stability function are used if a baseline is 10 kilometers or greater.

11. The method as claimed in claim 7, wherein the ratio smoothing function is:

$\tilde{\text{Ratio}}=\text{Ratio}+\tilde{\text{Ratio}} *(N-1)/N$ where N is the width of the moving window.

12. The method as claimed in claim 10, wherein the ambiguity stability function includes:

incrementing a counter for each epoch in which double differenced ambiguities remain the same; and if the double differenced ambiguities are not zero and less than 50 epochs are counted, resetting the counter.

13. A system for providing improved real time kinematics determination comprising:

means for determining a first position estimate;

means for performing an ambiguity resolution function having an output that provides an ambiguity resolution of the first position estimate by decorrelating first and second measurements, wherein the first and second measurements are inputs to the ambiguity resolution function;

means for selecting a model of distance dependent and distance independent errors in the first and second measurements; and means for deriving a second position estimate as an output from a filter by inputting into the filter the output of the ambiguity resolution function and the distance dependent and distance independent errors.

14. The system of claim 13, wherein the filter is a Kalman filter, the system further comprising:

means for, based on the model, calculating a double differenced variance matrix; and means for updating the filter with the calculated variance matrix.

15. The system of claim 13, wherein the first and second measurements are decorrelated using the function:

$\tilde{V}_2=\tilde{H}_2 X+\tilde{L}_2,$ wherein $\tilde{L}_2=L_2-\alpha L_1;$ $\tilde{H}_2=H_2-\alpha H_1;$ $$\tilde{D}_2 = (R_{L2}^2 + \alpha^2 R_{L1}^2 -$$

$$2\alpha R_{L1,L2}) \begin{bmatrix} W_1 + W_{ref} & W_{ref} & \ldots & W_{ref} & W_{ref} \\ W_{ref} & W_2 & \ldots & W_{ref} & W_{ref} \\ \vdots & \vdots & \ddots & \vdots & \vdots \\ W_{ref} & W_{ref} & \ldots & W_{n-2} + W_{ref} & W_{ref} \\ W_{ref} & W_{ref} & \ldots & W_{ref} & W_{n-1} + W_{ref} \end{bmatrix};$$

$$\alpha = \begin{cases} 1 \\ \lambda_1/\lambda_2 \\ \lambda_2/\lambda_1 \\ 0 \\ R_{L1,L2}/R_{L1}^2 \end{cases}; \text{ and}$$

wherein $L_1$ represents a first measurement of a first signal with wavelength $\lambda_1$;

$L_2$ represents a second measurement of a second signal with wavelength $\lambda_2$;

$\alpha$ represents the model, the model $\alpha$ selected from $\alpha=\lambda_1/\lambda_2$ for a geometry-free combination, $\alpha=\lambda_2/\lambda_1$ for an ionosphere-free combination, $\alpha=1$ for a widelane combination, $\alpha=0$ for an $L_2$ independent measurement, and $\alpha=R_{L1,L2}/R_{L1}^2$ for the correlation approach;

$V_2$ represents the post-fit residual vector of $L_2$;

$H_1$ represents a design matrix of $L_1$;

$H_2$ represents a design matrix of $L_2$;

X represents a Kalman filter state vector;

$D_2$ represents a variance-covariance matrix of $L_2$;

$\tilde{V}_2, \tilde{H}_2, \tilde{L}_2,$ and $\tilde{D}_2$ represent orthogonalized versions of $V_2, H_2, L_2,$ and $D_2$, respectively;

$R_{L1}^2$ represents zenith variance for single differenced $L_1$ measurements;

$R_{L2}^2$ represents zenith variance for single differenced $L_2$ measurements;

each W is: $W_n = 1.0 + 7.5e^{-E/15}$ wherein E represents the elevation angle of a satellite n in a plurality of satellites, wherein n represents a satellite ordinal in the plurality of satellites;

$W_{ref}$ represents a reference satellite of the plurality of satellites; and wherein after the new values of $\tilde{V}_2$, $\tilde{H}_2$, $\tilde{L}_2$, and $\tilde{D}_2$ are formed, $L_1$ and $L_2$ are updated independently, thereby decorrelating $L_1$ and $L_2$.

* * * * *